United States Patent [19]
Gill

[11] 4,024,422
[45] May 17, 1977

[54] HOMOPOLAR MOTOR-BATTERY

[76] Inventor: George Herbert Gill, Box 228, Wyandotte, Okla. 74730

[22] Filed: Mar. 18, 1976

[21] Appl. No.: 668,339

[52] U.S. Cl. .................... 310/178; 310/40 R; 310/46; 310/68 R; 310/219; 318/139
[51] Int. Cl.² .................... H02K 31/04
[58] Field of Search .......... 310/40, 46, 67, 68 R, 310/178, 219; 318/139

[56] References Cited
UNITED STATES PATENTS

| | | | |
|---|---|---|---|
| 2,710,371 | 6/1955 | Baensch | 318/139 |
| 2,914,688 | 11/1959 | Matthews | 310/178 |
| 2,919,358 | 12/1959 | Marrison | 310/46 |
| 3,293,470 | 12/1966 | Polgreen | 310/178 |
| 3,585,398 | 6/1971 | Harvey | 310/178 X |
| 3,833,841 | 9/1974 | Loomis | 318/139 |

*Primary Examiner*—Donovan F. Duggan
*Attorney, Agent, or Firm*—R. S. Sciascia; Roy Miller

[57] ABSTRACT

A homopolar motor-battery combination having axially magnetized elements alternating with conductive disks attached to a motor shaft. The conductive disks and an electrochemically active shroud member around the disk rims act as battery electrodes to send current through the disks. The current reacts with the axial magnetic field to produce rotation of the disks and shaft when immersed in an electrolyte.

12 Claims, 3 Drawing Figures

HOMOPOLAR MOTOR-BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a homopolar motor, and more particularly to a practical homopolar motor that is mated with a low voltage seawater activated battery to act as the power source of a scuba assist device.

The homopolar (acyclic, or Faraday) motor is fundamentally a high conductivity disk rotatable in a magnetic field. When current is applied between the shaft and rim of the disk, the current reacts with the magnetic field to produce a torque in the disk. The homopolar motor is also a low voltage, high current device, since the disk is essentially a one turn coil only, and disks cannot be connected in series for higher voltages without considerable difficulty. In the original version by Faraday, current was conducted into the rim of the disk at one restricted area where the disk dipped into a pool of mercury. A horseshoe magnet applied a magnetic flux across the current zone, between the pool and the shaft of the disk. The remainder of the disk did not contribute to the motor torque since it contained neither current nor magnetic flux.

Modern magnetic materials, such as ceramics, are capable of producing flux over the entire area of the disk, but then the current must also be introduced around the entire periphery of the disk. This peripheral current introduction is a limitation of past desings of homopolar motors: only a centrifugally maintained mercury ring or multiple brushes can be used to introduce the current. The centrifugal ring is impractical for units in mobile service or where there is frequent stopping and starting. Brushes must be applied to the highest velocity portion of the disk, so the friction, wear, vibration and arcing are very difficult to control.

A seawater battery is a unit in which each of the battery cells is immersed in an essentially infinite electrolytic volume. Since all of the cells are in the same volume of electrolyte, there are multiple leakage paths between all elements of the cells. The number of cells that can be connected in series is limited. The voltage of the battery is severely limited; the unit is a low voltage, high current, low impedance device. However, such a battery can provide the electrical requirements of a homopolar motor.

SUMMARY

Accordingly, the present invention provides a homopolar motor-battery combination which eliminates the current introduction problem by making the rim of the disk the anode of a battery, whereby current is generated in the disk itself by the battery electrolyte. No additional contacts are required. The full potential of the low impedance characteristic of both elements, the homopolar motor and the seawater battery, are realized when the combination is immersed in electrolyte, since there is an individual battery cell for each disk, with all connected in parallel. Conductive electrochemically positive disks (anodes) are mounted on a conductive shaft with axially magnetized ceramic magnets mounted coaxially on the shaft between and outside the sides of the disk. A magnetic yoke is connected to the end magnets to complete the magnetic flux path. An electrochemically negative shroud member encloses the rims of the disks, and the electrical circuit is completed by a wire connected to the shroud member at one end and to a brush in contact with the shaft at the other end, thereby completing the battery circuit between the anode and cathode members. When the motor-battery combination is removed from the electrolyte, all chemical battery action stops, and when thoroughly dried out, infinite storage is practical. Yet simple immersion in the electrolyte instantly activates the unit. Since no housing is needed, there are no shaft seals or containers to need pressurization, and the unit is, therefore, particularly adaptable to undersea applications from shallow scuba operations to deep sea power applications.

DESCRIPTION OF THE PREFERRED EMBODIMENT

Figure 1:
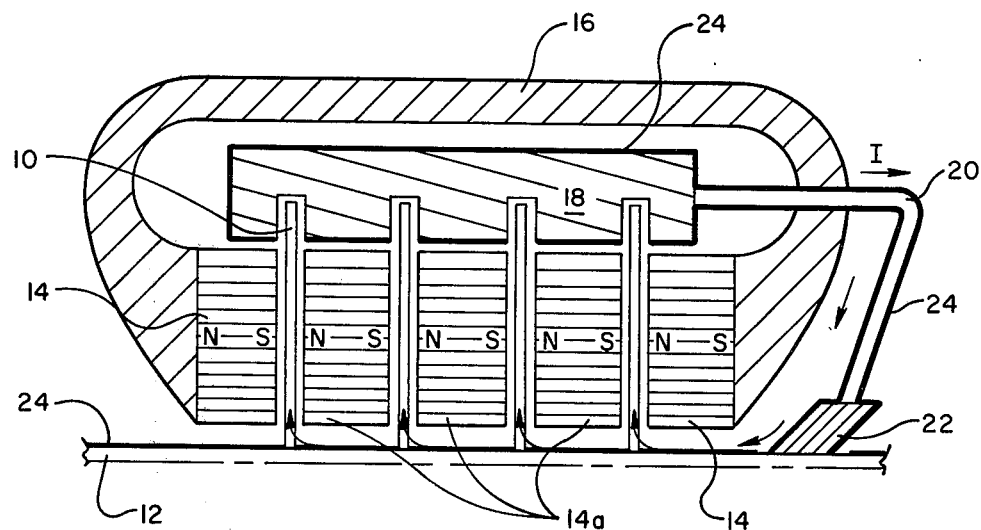
FIG. 1 is a cross-sectional half-section of the homopolar motorbattery combination.
Figure 3:
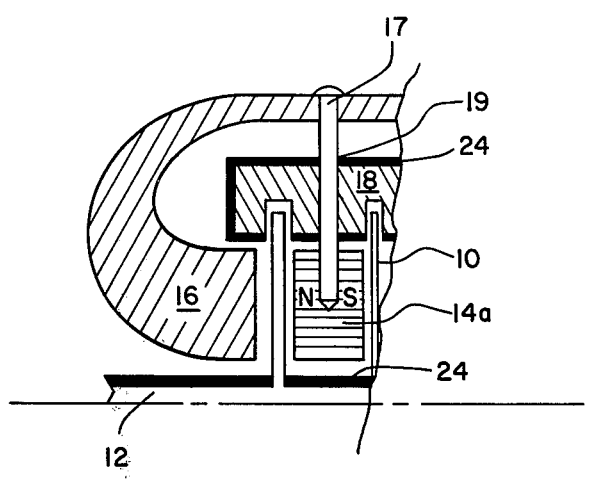
FIG. 3 is a cross-sectional part-section of another embodiment of the homopolar motor-battery combination.

Referring now to the drawings, FIG. 1 shows a plurality of disks 10 mounted on a conductive shaft 12. The disks 10 are made of a strongly electrochemically positive material such as gold, nickel, copper, silver or the like (which may be only a plating since the disks are not corroded by the operation). A plurality of permanent disk magnets 14, 14a which are axially magnetized, preferably of ceramic material, although other materials such as Alnico may be used, are arranged alternately with the disks 10. A yoke 16 of soft magnetic material is connected to the end magnets 14 to complete the magnetic circuit. The shaft 12 and magnets 14, 14a are supported within the yoke 16 by any suitable means. A shroud member 18 of a highly electrochemically negative material, such as calcium, zinc, magnesium or an alloy or amalgam thereof, encloses the rims of the disks, formed to closely conform to the configuration of the disks. The shroud member 18 is supported within the yoke 16 by any suitable means. The magnets 14a may be attached to the shaft 12 and rotate therewith, or may be attached to the shroud 18 or yoke 16 with clearance allowed so that shaft 12 and disk 10 can rotate freely within said clearance, without affecting the operation of the motor. Magnets 14 may be attached to the yoke with clearance for the shaft, or may be replaced by soft pole pieces or extensions of the yoke 16 as is illustrated in FIG. 3. A conductor 20, connected at one end to the shroud member 18, and a brush 22, connected to the other end of the conductor and in contact with the shaft 12, completes the electrical circuit. An insulating coating 24 covers (a) the entire surface of the shroud member 18, except for the active surface immediately adjacent to the rims of the disks 10, (b) the conductor 20, (c) the brush 22, except for the contact surface with shaft 12, and (d) the shaft to the extent possible.

FIG. 3 shows a method of supporting magnets 14a from the yoke 16 by means of pins 17 connected to the yoke and extending through holes 19 in the shroud 18. Also shown in an embodiment in which the yoke 16 is extended to eliminate the end magnets 14.

When the entire assembly is immersed in or filled with an electrolyte, such as seawater or the like, the disks 10 form the anode and the shroud member 18 forms the cathode of the battery which sends electric current, I, through the body of the cathode, through the conductor 20, the brush 22, shaft 12 and radially outward to the rims of the disks 10 as shown by the arrows in FIG. 1. The resultant current from the disks causes a force reaction with the axially magnetic field produced by the magnets 14, 14a whereby a torque is generated to cause rotation of the disks and shaft 12. The brush 22 continues to transmit current to the shaft 12 as it rotates, resulting in a continuously rotating electric motor.

The motor will stop when it is removed from the electrolyte, but it may also be stopped by opening the conductor 20 with a switch (not shown). In this case, however, the interior of the shroud 18 may be wasted away unless it is processed in accordance with the usual practices used in battery manufacture.

Figure 2:
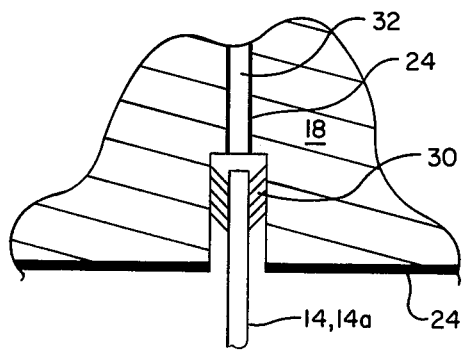
FIG. 2 is an exploded view of the disk rim and shroud member of another embodiment of the homopolar motor-battery combination.

Referring now to FIG. 2, a plurality of non-conductive whiskers 30 on the periphery of the disks 10 make contact with the active surface of the shroud member 18 which immediately surrounds and encloses the rims of the disks. Vents 32 are provided in the shroud member 18 where the shroud member encloses the rims of the disks 10.

Since a problem with any battery is polarization of the cathode during use, such polarization consisting of the formation of tiny hydrogen bubbles on the surface of the cathode, the action of the whiskers 30 against the active surface of the shroud member 18 while the disks 10 are rotating is to sweep these bubbles off the active surface. These bubbles are then exhausted through the vents 32. Also, some magnesium oxide or hydroxide is formed during discharge of the battery, and this too is swept away by the revolving whiskers 30 and exhausted through the vents 32.

There may be any number of disks 10 and magnets 14, 14a assembled on the shaft 12, as well as any number of conductors 20 and brushes 22 at either or both ends of the motor-batter combination.

The homopolar motor-battery combination provides a self-contained, light-weight power source for use in seawater such as for scuba assists. If such a device is desired for other environmments, a housing with appropriate seals, etc., could be used to enclose the homopolar motorbatter combination, such housing being filled with an appropriate electrolyte. The unit may be switched off by draining away the electrolyte, or a switch can also be provided to turn the combination on and off. Alternatively, the electrolyte might also be displaced by a non-polar fluid to stop the motor. Obviously, many other modifications and variations of the present invention are possible in light of the above teachings. It is, therefore, to be understood that, within the scope of the appended claims, the invention may be practiced otherwise than as specifically described.

What is claimed is:

1. A homopolar motor-battery comprising:
    an electrically conductive shaft;
    a plurality of electrically conductive disks mounted fixedly, coaxially on said shaft;
    a plurality of permanent magnets mounted coaxially upon said shaft alternately between and at the end of said disks, with the magnetic axis of said disks parallel to said shaft and series aiding;
    a yoke of magnetic material connected to said magnets at the end of said disks to complete the magnetic flux path;
    an electrochemically reactive, conductive shroud member within said yoke in close proximity to and enclosing the rims of said conductive disks;
    means for completing an electrical circuit between said shroud member and said shaft such that, when said motor-battery is immersed in an electrolyte, said shroud member and conductive disks form the cathode and anode members, respectively, of an electric battery causing current to flow through said shroud member, said completing means, said shaft, and radially outward to the rims of said disks, whereby said current, reacting with the axial magnetic flux of the magnets, causes said disks and shaft to rotate.

2. The homopolar motor-battery as recited in claim 1 wherein said magnets are fixedly mounted in said yoke with clearance provided for the rotation of said conductive disks and shaft within and between said magnets and shroud member.

3. The homopolar motor-battery as recited in claim 1 wherein said magnets are fixedly mounted in said shroud member with clearance provided for the rotation of said conductive disks and shaft within and between said magnets and said shroud member.

4. The homopolar motor-battery as recited in claim 1 wherein said magnets which are situated between said disks are fixedly mounted on and rotate with said shaft.

5. The homopolar motor-battery as recited in claim 1 further comprising an insulating coating covering (1) the entire surface of said shroud member except in the area enclosing the rims of said disks, (2) said means for completing said electric circuit between said shaft and said shroud member except at the points of contact between the said shaft and said shroud member, and (3) said shaft except at said point where said means of completing said electrical circuit contacts said shaft.

6. The homopolar motor-battery as recited in claim 5 further comprising:
    a plurality of non-conductive whiskers connected to the periphery of said disks to form brushes to sweep said enclosing areas of said shroud member, and
    a plurality of vents through said shroud members so that material swept from the surface of said enclosing areas is exhausted through said vents.

7. The homopolar motor-battery as recited in claim 6 wherein the material of the disk comprises a structural core material plated with an electrochemically positive metal, and the material of said shroud member comprises an electrochemically negative metal.

8. The homopolar motor-battery as recited in claim 7 wherein said means for completing said electric circuit comprises:
    a conductive electrical brush slidably contacting the surface of said shaft; and
    a conductor connected at one end to said brush and at the other end to said shroud member.

9. The homopolar motor-battery as recited in claim 8 further comprising an electrical switch connected in series with said conductor whereby said motor-battery is switched on and off.

10. The homopolar motor-battery as recited in claim 8 further comprising:
   a housing surrounding said motor-battery such that the shaft protrudes from said housing and is free to rotate relative to said housing; and
   an electrolyte contained within said housing.

11. The homopolar motor-battery as recited in claim 10 wherein said electrochemically positive metal is selected from the group consisting of gold, silver, copper and nickel, and said electrochemically negative metal is selected from the group consisting of calcium, magnesium, zinc, and an alloy or amalgam thereof.

12. The homopolar motor-battery as recited in claim 11 further comprising means for displacing said electrolyte from said housing with a non-polar fluid whereby said motor-battery is switched off.

* * * * *